(12) United States Patent
Anderson et al.

(10) Patent No.: US 6,940,633 B1
(45) Date of Patent: Sep. 6, 2005

(54) CALIBRATION CELL FOR MICRO-MIRROR DRIVE CIRCUIT

(75) Inventors: Daryl E. Anderson, Corvallis, OR (US); Dennis J. Schloeman, Corvallis, OR (US); Eugene J Mar, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/911,162

(22) Filed: Aug. 2, 2004

(51) Int. Cl.[7] ............................................. G02B 26/00
(52) U.S. Cl. ...................................... 359/291; 359/290
(58) Field of Search ................................ 359/290, 291, 359/292, 293, 295, 298, 222, 223, 320, 323, 359/214, 224, 296, 239, 297

(56) References Cited

U.S. PATENT DOCUMENTS 5,668,611 A  *  9/1997  Ernstoff et al. ............. 348/771
6,809,851 B1 * 10/2004  Gurcan ....................... 359/290

* cited by examiner

*Primary Examiner*—Hung Xuan Dang
*Assistant Examiner*—Tuyen Tra

(57) ABSTRACT

A micro-mirror system has a closely spaced array of micro-mirror cells, a calibration timing circuit, and test circuitry. Each micro-mirror cell has a micro-mirror and a timing circuit. The timing circuit controls deflection of the micro-mirror. The micro-mirror is in close proximity with the timing circuit. The calibration timing circuit is like the timing circuits of the micro-mirror cells. The test circuitry tests a time constant of the calibration timing circuit.

15 Claims, 4 Drawing Sheets

CALIBRATION CELL FOR MICRO-MIRROR DRIVE CIRCUIT

BACKGROUND

In micro-mirror arrays, timing circuits control the timing of the mechanical deflection of each micro-mirror. A voltage is applied to the timing circuit to cause the deflection in the micro-mirror. As the voltage drains off the timing circuit, the micro-mirror returns to a non-deflected position. Calibration of the timing circuits is helpful to precisely determine the length of time the micro-mirror remains deflected after a voltage is applied.

Calibration of the timing circuits in the micro-mirror arrays is difficult as the timing circuits are in very close proximity to the micro-mirrors. There is very little space for calibration circuitry between the timing circuits and the micro-mirrors.

DETAILED DESCRIPTION OF THE INVENTION

Figure 1:
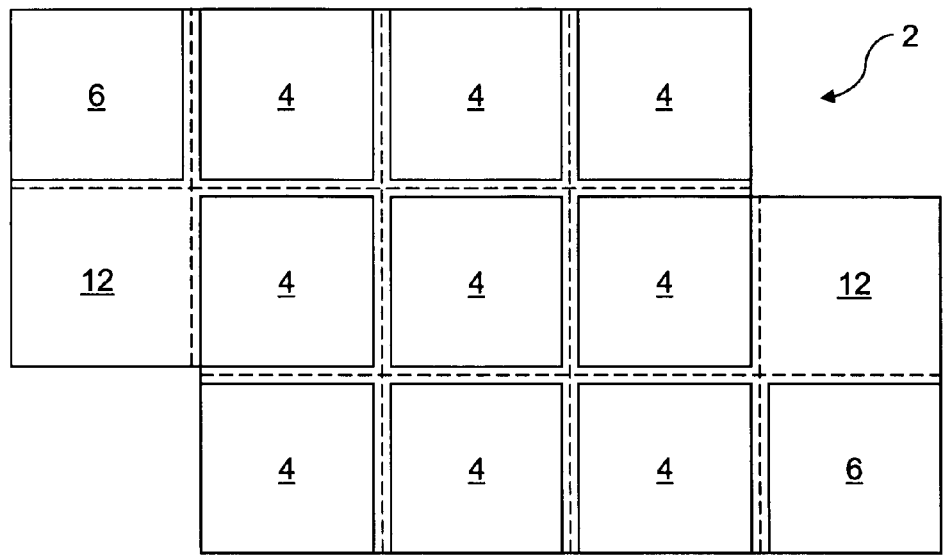
FIG. 1 is an illustration of a micro-mirror system including one embodiment of the present invention calibration cells.

FIG. 1 illustrates, in block form, one embodiment of a micro-mirror system 2. Micro-mirror system 2 includes an array of micro-mirror cells 4 and calibration cells 6. Calibration cells 6 are positioned along a border of the array. Although two calibration cells 6 are shown, the present invention only requires one calibration cell 6. Additional calibration cells 6 may be used to compensate for calibration differences across the array. Additionally, for better illustrating the present invention, only a 3×3 array is shown. However, the present invention encompasses all sizes of arrays.

Figure 2:
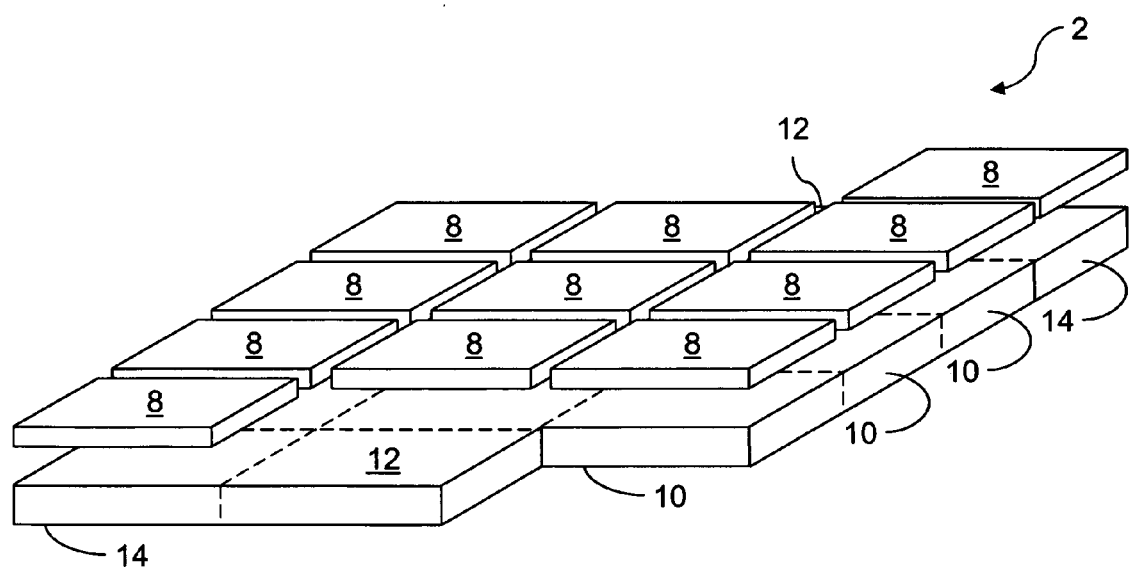
FIG. 2 is an orthogonal view of the micro-mirror system illustrated in FIG. 1.

FIG. 2 illustrates an orthogonal view of the micro-mirror system 2.

Each micro-mirror cell 4 includes a micro-mirror 8 and a timing circuit 10. Micro-mirror 8 is any reflective surface. Timing circuit 10 controls the timing of the mechanical deflection of the micro-mirror 8. Micro-mirror 8 and timing circuit 10 are in close proximity.

Each calibration cell 6 includes test circuitry 12, calibration timing circuit 14. In one embodiment, calibration cell 6 additionally includes micro-mirror 8. Calibration timing circuits 14 are like timing circuits 10. The more similar calibration timing circuits 14 are to timing circuits 10, the more accurately calibration timing circuits will reflect voltage discharge rates in timing circuits 10.

Figure 3:
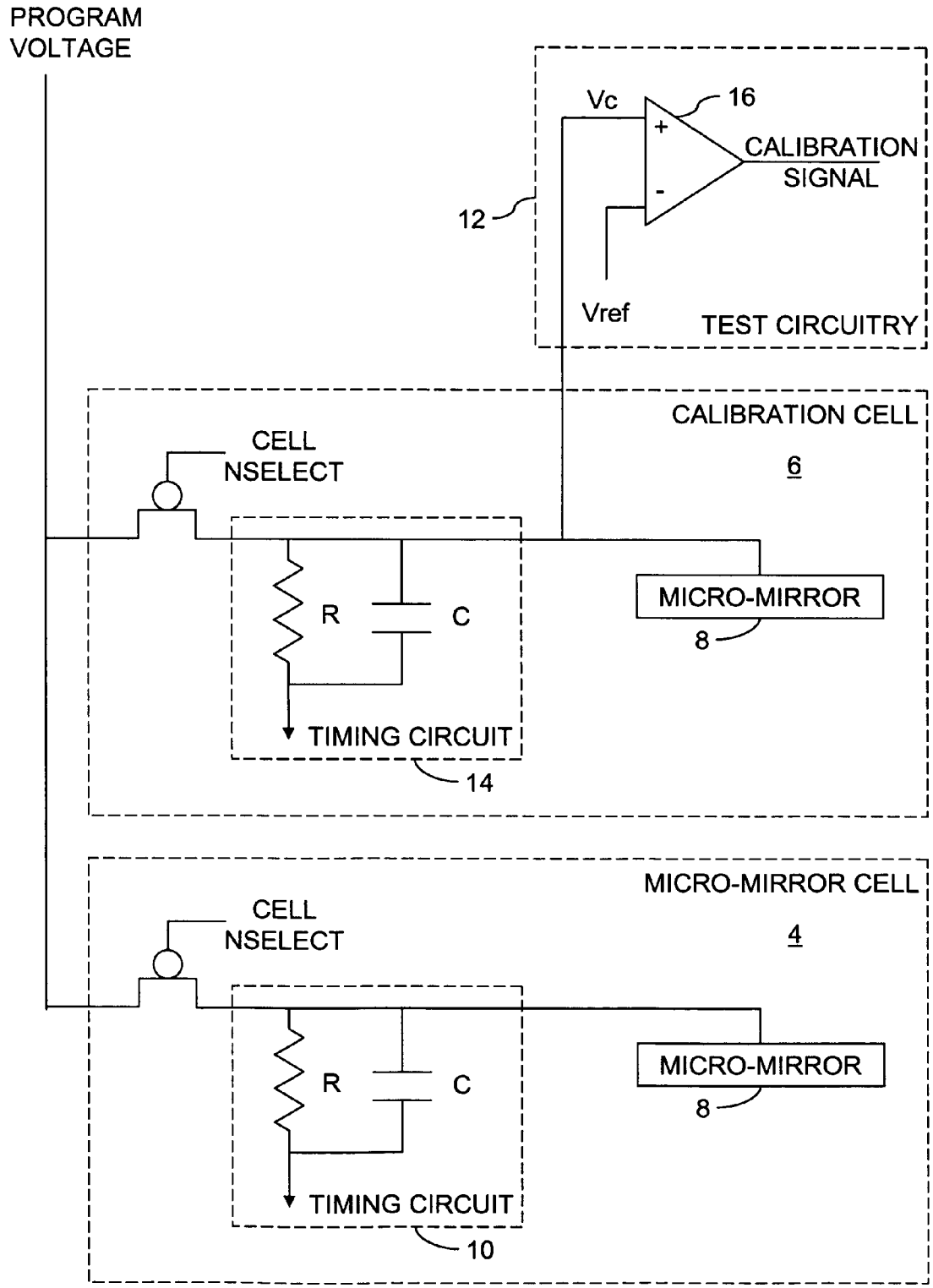
FIG. 3 is a circuit diagram showing one embodiment of the present invention calibration cells.

Test circuitry 12 is any circuitry configured to test a time constant of calibration timing circuits 14. FIG. 3 illustrates an embodiment of timing circuit 10, test circuitry 12, and calibration timing circuit 14 in more detail. In one embodiment, each timing circuit 10 and calibration timing circuit 14 are embodied in an integrated circuit.

In one embodiment, each timing circuit 10 and calibration timing circuit 14 includes resistive elements R and capacitive elements C configured in parallel. Resistive elements R includes the parasitic resistance of cell 4, 6 and may also include additional resistive components. Capacitive elements C include the intrinsic capacitance of micro-mirror 8 and may also included additional capacitive components. When a cell 4, 6 is selected by applying an nSelect signal, the program voltage is applied to the timing circuit 10, 14. The program voltage causes the timing circuit 10, 14 to charge. When the nSelect signal is removed, the program voltage is no longer applied to timing circuits 10, 14 and timing circuits 10, 14 begin to discharge.

In micro-mirror cells 4, the charged timing circuit 10 causes deflection in micro-mirror 8. In calibration cells 6, the discharge of the calibration timing circuit 14 may be observed over time by test circuitry 12.

In one embodiment, test circuitry 12 includes a comparison device 16 into which is delivered the signal Vc from calibration timing circuit 14. Signal Vc represents the signal that causes the deflection of micro-mirrors 8 in micro-mirror cells 4. Into comparison device 16 is also fed a reference voltage Vref. Reference voltage Vref represents a threshold voltage value useful for calibrating micro-mirror system 2. One useful threshold voltage is the voltage value at which micro-mirrors 8 return from a deflected to a non-deflected position.

Figure 4:
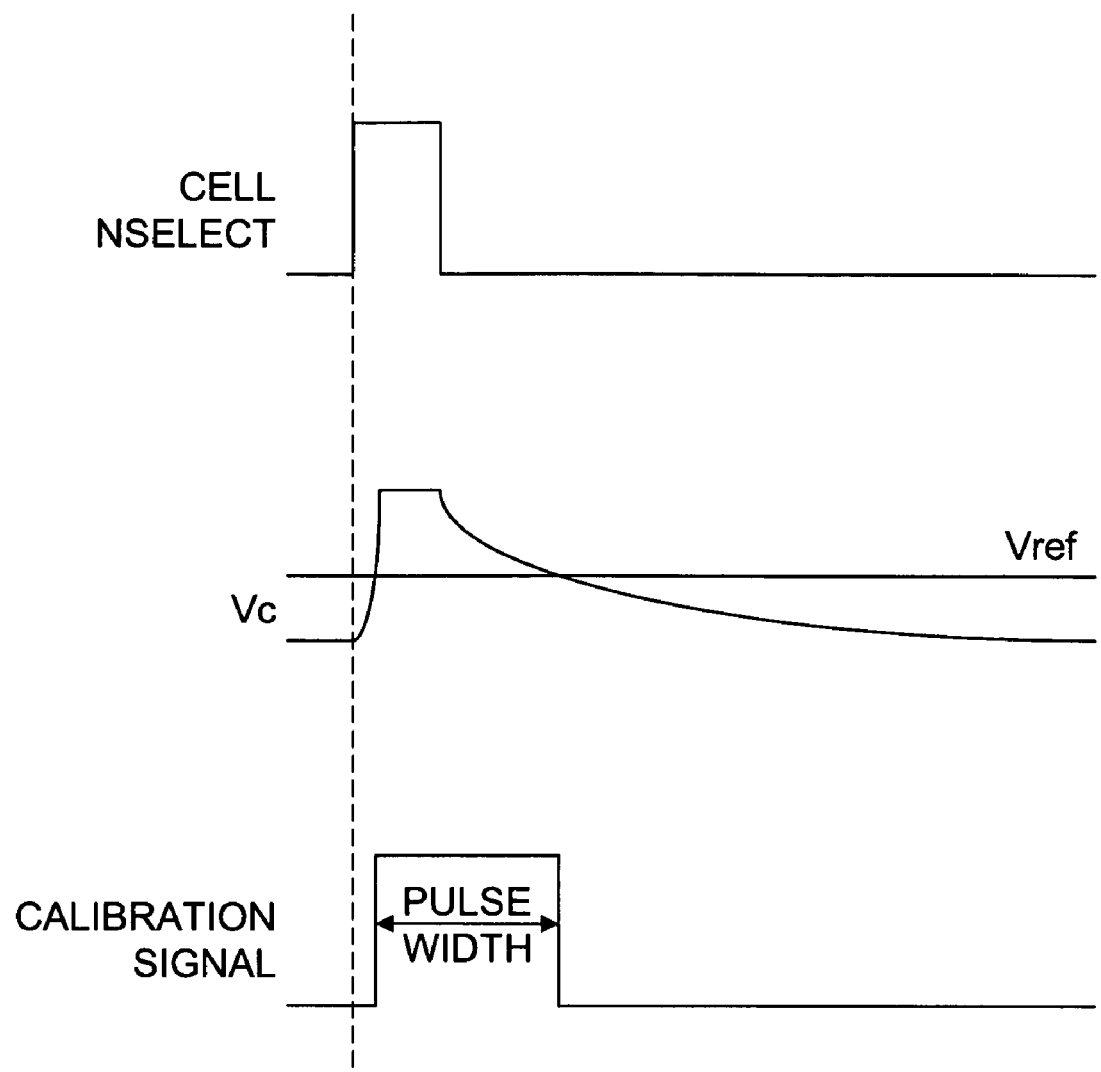
FIG. 4 is a timing diagram showing relative voltage levels in one embodiment of the present invention.

FIG. 4 illustrates one embodiment of voltage levels during operation of calibration cell 6. An nSelect signal is applied to select calibration cell 6. As the nSelect signal is applied, program voltage is allowed to pass to calibration timing circuit 14, charging capacitive element C. Output Vc represents the voltage level across capacitive element C. As Vc increase passed threshold voltage level Vref, the calibration signal pulse begins.

Once the nSelect signal is removed, program voltage is no longer applied to calibration timing circuit 14 and capacitive element C begins to discharge. The discharge is reflected by a drop in Vc. Once Vc decreases below threshold voltage level Vref, the calibration signal pulse ends. The beginning and ending of the calibration signal pulse may be timed. The pulse width of the calibration signal is related to the time constant of timing circuit 14.

Figure 5:
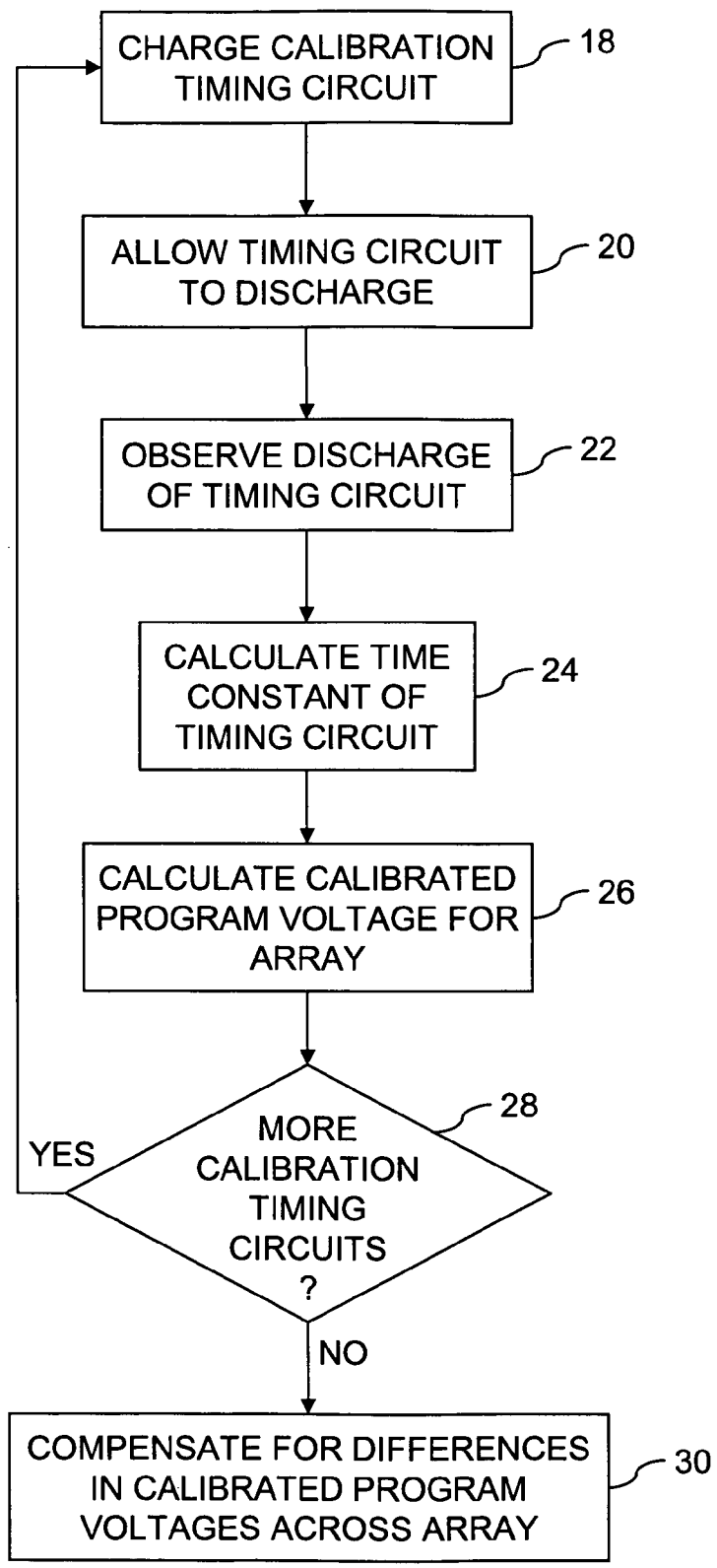
FIG. 5 is a flow chart illustrating one embodiment of the present invention method of calibrating an array of cells.

FIG. 5 is a flow chart representing steps of one embodiment of the present invention for calibrating an array of cells. Although the steps represented in FIG. 5 are presented in a specific order, the present invention encompasses variations in the order of steps. Furthermore, additional steps may be executed between the steps illustrated in FIG. 5 without departing from the scope of the present invention.

Capacitive element C of a calibration timing circuit 14 along a border of an array of micro-mirror cells 4 is charged 18 to a voltage value. In one embodiment, capacitive element C is charged by applying a program voltage to calibration timing circuit 14.

Capacitive element C is allowed to discharge 20. The discharge of capacitive element C is observed 22 over time. In one embodiment, observing 22 the discharge of capacitive element C over time includes measuring the time required for capacitive element C to discharge to a threshold value. In another embodiment, observing the discharge of capacitive element C over time includes measuring the remaining voltage of capacitive element C after a known time.

From the observed discharge, the time constant of the timing circuit 14 is calculated 24. From the voltage value to which capacitive element C is charged and the time constant, a calibrated program voltage for the array is calculated 26.

In one embodiment, the calibrated program voltage is the program voltage necessary to achieve a desired pulse width, representing a desired time in which micro-mirrors 8 remain in the deflected position. In one embodiment, the calibrated program voltage is the program voltage used in the calibration scaled by the ratio of the desired time for micro-mirrors 8 to remain in the deflected position to the pulse width of the calibration signal.

If more calibration circuits are to be used 28, the steps are repeated for each capacitive element C of each calibration timing circuit 14 along the border of the array to discover a plurality of calibrated program voltages. Differences in calibrated program voltages are then compensated for 30 across the array. In one embodiment, the differences are compensated for 30 by extrapolating between the calibrated program voltages for each micro-mirror cell 4.

The foregoing description is only illustrative of the invention. Various alternatives, modifications, and variances can be devised by those skilled in the art without departing from the invention. Accordingly, the present invention embraces all such alternatives, modifications, and variances that fall within the scope of the appended claims.

What is claimed is:

1. A micro-mirror system comprising:
    a closely spaced array of micro-mirror cells, each micro-mirror cell having a micro-mirror and a timing circuit for deflecting the micro-mirror, the micro-mirror in close proximity with the timing circuit;
    a calibration timing circuit along a border of the array, the calibration timing circuit like the timing circuits of the micro-mirror cells; and
    test circuitry configured to test a time constant of the calibration timing circuit.

2. The micro-mirror system of claim 1 wherein each timing circuit and the calibration timing circuit includes resistive and capacitive elements in parallel.

3. The micro-mirror system of claim 1 wherein each timing circuit and the calibration timing circuit are embodied in an integrated circuit.

4. A method for calibrating a program voltage for an array of micro-mirror cells, each cell having a timing circuit for controlling a micro-mirror, the method comprising:
    charging, to a voltage value, a capacitive element of a timing circuit along a border of the array;
    allowing the capacitive element to discharge;
    observing the discharge of the capacitive element over time;
    calculating, from the observed discharge, the time constant of the timing circuit; and
    calculating, from the voltage value and the time constant, a calibrated program voltage for the array.

5. The method of claim 1 wherein observing the discharge of the capacitive element over time includes measuring the time required for the capacitive element to discharge to a threshold value.

6. The method of claim 1 wherein observing the discharge of the capacitive element over time includes measuring the remaining voltage of the capacitive element after a known time.

7. The method of claim 1 further including:
    repeating the steps for a plurality of capacitive elements of timing circuits along the border of the array to discover a plurality of calibrated program voltages and compensating for differences in calibrated program voltages across the array.

8. A micro-mirror system comprising:
    a closely spaced array of micro-mirror cells, each micro-mirror cell having a micro-mirror and a timing circuit for deflecting the micro-mirror, the micro-mirror in close proximity with the timing circuit;
    a calibration timing circuit along a border of the array, the calibration timing circuit like the timing circuits of the micro-mirror cells; and
    means for testing a time constant of the calibration timing circuit.

9. The micro-mirror system of claim 8 wherein each timing circuit and the calibration timing circuit includes resistive and capacitive elements in parallel.

10. The micro-mirror system of claim 8 wherein each timing circuit and the calibration timing circuit are embodied in an integrated circuit.

11. A system for calibrating a program voltage for an array of micro-mirror cells, each cell having a timing circuit for controlling a micro-mirror, the system comprising:
    a calibration timing circuit along a border of the array, the calibration timing circuit having a capacitive element;
    means for charging the capacitive element to a voltage value;
    means for allowing the capacitive element to discharge;
    means for observing the discharge of the capacitive element overtime;
    means for calculating, from the observed discharge, the time constant of the timing circuit; and
    means for calculating, from the voltage value and the time constant, a calibrated program voltage for the array.

12. The system of claim 11 wherein the means for observing the discharge of the capacitive element over time includes means for measuring the time required for the capacitive element to discharge to a threshold value.

13. The system of claim 11 wherein the means for observing the discharge of the capacitive element over time includes means for measuring the remaining voltage of the capacitive element after a known time.

14. The micro-mirror system of claim 11 wherein each timing circuit and the calibration timing circuit are embodied in an integrated circuit.

15. The system of claim 11 further including:
    a plurality of calibration timing circuits along the border of the array, each calibration timing circuit having a capacitive element;
    means for charging each capacitive element to a voltage value;
    means for allowing each capacitive element to discharge;
    means for observing the discharge of each capacitive element over time;
    means for calculating, from each observed discharge, a time constant of each timing circuit; and
    means for calculating, from the voltage value and each time constant, a plurality of calibrated program voltages for the array
    means for compensating for differences in calibrated program voltages across the array.

* * * * *